United States Patent
Giraldo et al.

(10) Patent No.: US 11,579,937 B1
(45) Date of Patent: Feb. 14, 2023

(54) GENERATION OF CLOUD SERVICE INVENTORY

(71) Applicant: CITRIX SYSTEMS, INC., Fort Lauderdale, FL (US)

(72) Inventors: Sindy Giraldo, Fort Lauderdale, FL (US); Sai Varun Prasanth Soundararajan, Raleigh, NC (US)

(73) Assignee: Citrix Systems, Inc., Fort Lauderdale, FL (US)

(*) Notice: Subject to any disclaimer, the term of this patent is extended or adjusted under 35 U.S.C. 154(b) by 104 days.

(21) Appl. No.: 17/137,292

(22) Filed: Dec. 29, 2020

(51) Int. Cl.
*G06F 9/50* (2006.01)

(52) U.S. Cl.
CPC ............ *G06F 9/5072* (2013.01); *G06F 9/505* (2013.01); *G06F 9/5077* (2013.01); *G06F 2209/5015* (2013.01)

(58) Field of Classification Search
CPC ...... G06F 9/5072; G06F 9/505; G06F 9/5077; G06F 2209/5015
See application file for complete search history.

(56) References Cited

U.S. PATENT DOCUMENTS

2017/0093640 A1* 3/2017 Subramanian .......... H04L 41/12

* cited by examiner

*Primary Examiner* — Sisley N Kim (57) ABSTRACT

A data model characterizing a plurality of resources is received. The data model associates a first resource within a first remote computing environment with a first tag and a second resource within a second remote computing environment with a second tag. The data model is received from a database that is separate from the first remote computing environment and the second remote computing environment. The plurality of resources is grouped based on the first tag and the second tag. The grouping can form a first group associated with the first tag and a second group associated with the second tag. A first list of resources characterizing the first group and a second list of resources characterizing the second group is provided. Related apparatus, systems, techniques and articles are also described.

17 Claims, 6 Drawing Sheets

GENERATION OF CLOUD SERVICE INVENTORY

TECHNICAL FIELD

The subject matter described herein relates to monitoring and managing the use of cloud resources.

BACKGROUND

Cloud computing can include the on-demand availability of computer system resources, especially data storage and computing power, without direct active management by the user. The term can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

In an aspect, a data model characterizing a plurality of resources is received. The data model associates a first resource within a first remote computing environment with a first tag and a second resource within a second remote computing environment with a second tag. The data model is received from a database that is separate from the first remote computing environment and the second remote computing environment. The plurality of resources is grouped based on the first tag and the second tag. The grouping can form a first group associated with the first tag and a second group associated with the second tag. A first list of resources characterizing the first group and a second list of resources characterizing the second group is provided.

One or more of the following features can be included in any feasible combination. For example, a plurality of remote computing environments can be queried for costs associated with hosting resources. The querying can include querying the first remote computing environment for first costs associated with hosting the first resource within the first remote computing environment, and querying the second remote computing environment for second costs associated with hosting the second resource within the second remote computing environment. The providing can further include providing the costs associated with hosting resources. The first costs can be associated with the first resource. The second costs can be associated with the second resource. The first list of resources can further characterizes the first costs, and the second list of resources can further characterizes the second costs.

The grouping can be according to product identity. The first tag can include a first product identity and the second tag can include a second product identity. A product can includes a plurality of associated services. The grouping can be according to a plurality of components of a product. The first tag can include a first identity of a first component of the product, the second tag can include a second identity, the second identity can be of a second component of the product, the first component of the product can include a first service, and the second component of the product can include a second service.

Data characterizing changes to the data model can be received. The plurality of resources can be regrouped based on the received data. The regrouping can form a modified first group associated with the first tag and a modified second group associated with the second tag. The first list of resources can be updated based at least on the modified first group and updating the second list of resources can be based at least on the modified second group. The first remote computing environment can include a first cloud resource provider and the second remote computing environment can include a second cloud resource provider different than the first cloud resource provider.

The first remote computing environment can include an on premise computing environment. The data model can be received from a database that forms part of a services discovery platform including a service registry. The service registry can contain identities of available service instances and associated connection information for services within a plurality of remote computing environments. New service instances, during or after instantiation, can register with the services registry. The first resource can include a virtual machine, a storage account, a web application, a database, and/or a virtual network.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Cloud providers can provide a remote computing environment, for example, with virtual machine (VM) infrastructure such as a hypervisor using native execution to share and manage hardware, allowing for multiple environments which are isolated from one another, yet exist on the same physical machine. The computing environment can include an infrastructure as a service (IaaS) platform that provides application programming interfaces (APIs) to dereference low-level details of underlying network infrastructure. In such an IaaS platform, pools of hypervisors can support large numbers of VMs and include the ability to scale up and down services to meet varying needs. IaaS platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

Companies with multiple software product offerings may utilize cloud computing resources for supporting those products. For example, a company may have many products being used by many business customers and millions of end users. Each product can include multiple services and each service can consume some amount of cloud resources as it executes (e.g., operates). For a Software-as-a-Service (SaaS) business, tagging (also referred to as labeling) of cloud and on-premises resources can be considered imperative for the security, management, and cost of deployed applications. Tagging a resource can include applying or associating a label with a resource for the purpose of managing that resource. For example, a resource such as a virtual machine can be tagged with a product name that the virtual machine supports. Tagging can include maintaining an association between the label and the resource (e.g., in the form of a table, as metadata, and the like).

But existing approaches to tagging of cloud and on-premises resources is inaccurate and inconsistent, which can result in inefficient enforcement of internal rules and results in manual (e.g., non-automated) workflows. For example, each cloud provider contains its own tagging information, the data management is complex since each cloud provider offers a different tagging strategy, the tag data may not be consistent between cloud providers, and some cloud providers limit the number of tags that can be associated with a given resource. Furthermore, governance of tagging of large scale systems that may operate across multiple cloud accounts and providers may be challenging. For example, tagging may require specific security access rights to cloud accounts (e.g., administrator privileges) and on-premises resources may not have tagging capabilities.

While it may be possible to manually track and label each resource with its associated product, such a manual approach requires specific knowledge of the cloud computing environment or domain specific knowledge and may be inappropriate for dynamic resource management. And lacking knowledge of which resources support which products can lead to challenges in implementing security policies, identifying security flaws, tracking product usage for compliance purposes, and the like.

In addition, due to the nature of the cloud, it can be difficult to accurately calculate cloud infrastructure cost since price can vary depending on different factors such as geolocation, resource stock keeping unit (SKU), special discount pricing for large contracts, custom negotiated price, and resource availability. Some current solutions rely on human intervention for the development of a static track sheet to enumerate infrastructure associated with a service and to calculate cost. Cloud providers offer cloud infrastructure calculators to provide insights in cost but this approach does not provide a dynamic solution to group resources by services or provide insight into custom pricing.

Accordingly, some implementations of the current subject matter include an approach to tag management in which, instead of fragmenting tagging across multiple cloud providers, a centralized inventory database and inventory web service provides cloud-provider-agnostic tagging capabilities. The centralized database, which may be separate (e.g., independent, remote, and different) from the one or more cloud providers, can store a data model that includes resource identities and their associated tags. The data model can be utilized to efficiently group resources by product (or components of products) and provide a list of those resources by product (as described more fully below, a product can include any logical grouping of microservices). In addition, cloud providers can be queried to obtain up-to-date cost information for each resource. The cost information can be combined with the list of resources by product to provide a bill of materials including costs thereby enabling greater insight into business operation and management including profit margins and facilitating business decisions.

In some implementations, the data model can be updated by a service discovery platform that can automatically detect devices and services offered by these devices on a computer network to create a dynamic and current bill of materials.

By utilizing a centralized database and associated web service that includes a data model that defines cloud infrastructure components of a service, some implementations of the current subject matter can include generating a cloud infrastructure bill of materials for one or more SaaS products or services. Some implementations of the current subject matter can result in improving the ability of an enterprise to scale its cloud computing in a manner that is efficient and cost effective. For example, the calculated bill of materials can define operational expenses (OpEx) as compared to costs of goods sold (COGS), enabling improved insight into and management of cloud resources. Further, some implementations can include providing a dynamic approach to listing and grouping resources to create a bill of materials with respective cost. Calculated cost can be based on a business account with the cloud provider and not an approximate value. In some implementations, the bill of material can be automatically updated based on newly deployed resources.

The current subject matter can include not only determining and providing a list of materials at the product level, it can provide a breakdown of materials at the microservice level.

In some implementations, the current subject matter provides a mechanism by which a bill of materials is achieved by leveraging a service discovery platform to provide an updated and consistent catalog of some (if not all) resources across cloud provider resources and/or on-premises resources. The use of a service discovery platform (which can perform automatic detection of devices and services offered by these devices on a computer network) enables some implementations to dynamically generate an inventory of resources and therefore dynamically generate a bill of materials. The services discovery platform can enable analysis of historical tagging data, analysis of historical resource inventory data, and enable additional insights into trends using the inventory data.

Figure 1:
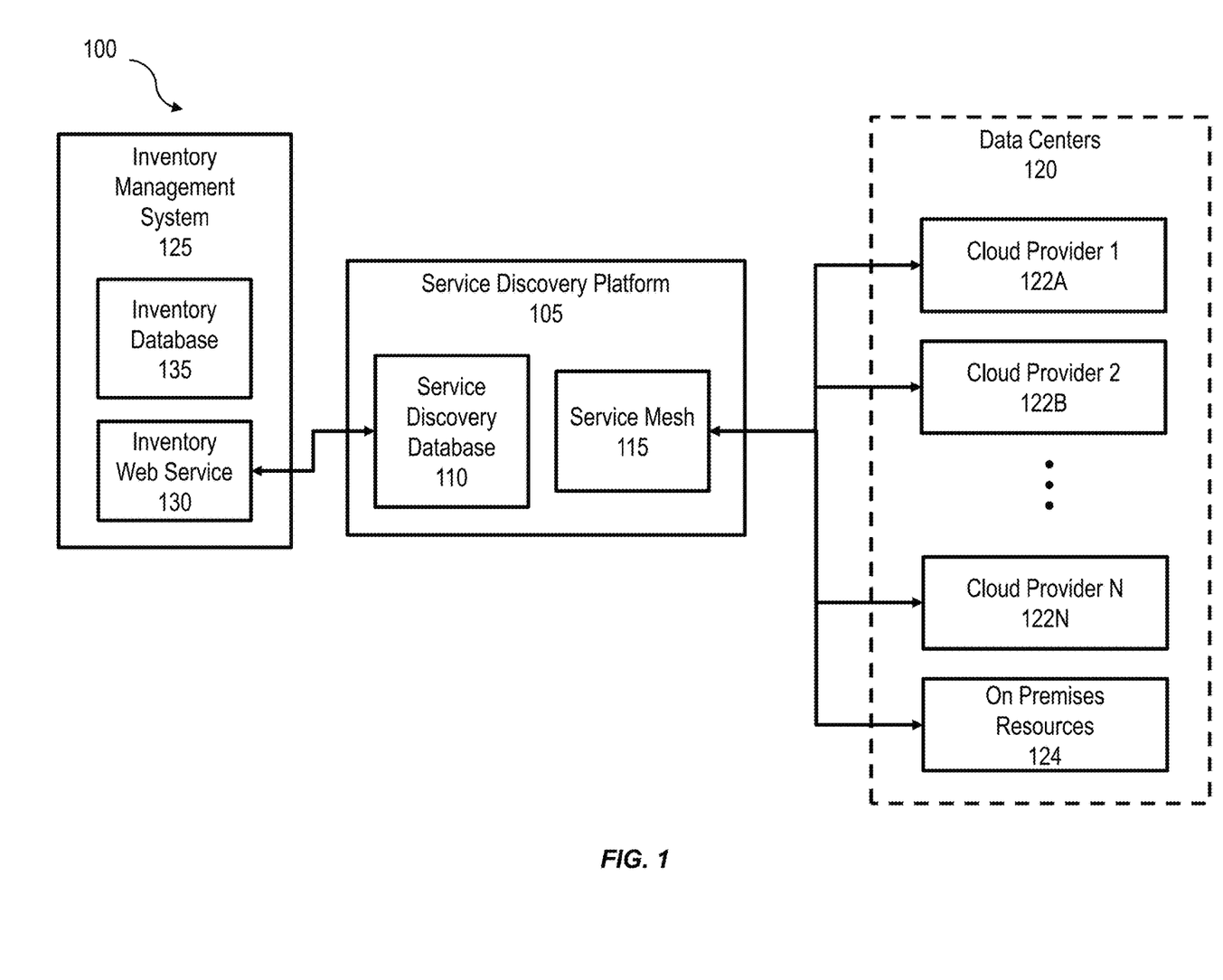
FIG. 1 is a system block diagram illustrating an example centralized tagging system according to some example implementations.

FIG. 1 is a system block diagram illustrating an example centralized tagging system 100 according to some example implementations that can include a centralized inventory database 135 and inventory web service 130 that can improve management of cloud resources across multiple cloud providers 122A-N and/or on-premises resources 124.

The system 100 includes a service discovery platform 105 that includes a service discovery database 110 and a service mesh 115. The service mesh 115 includes a dedicated infrastructure layer for facilitating service-to-service communications between microservices. An example service mesh 115 can include Consul developed by Hashicorp, Inc. of San Francisco, USA. The service mesh 115 can provide observability into communications, secure connections, and/or automate retries and back off for failed requests.

The service mesh 115 is in communication with one or more datacenters 120 that can include cloud providers 122A-N and/or on-premises resources 124. Each of data centers 120 can include a remote computing system providing a remote computing environment and can provide resources (also referred to as virtual resources). The resources can include any manageable item that is available through a cloud provider such as virtual machines, storage accounts, web applications, databases, and virtual networks. Other resource types may be used as well.

Some (if not all) cloud or on-premises resources within datacenters 120 are registered to the service discovery platform 105. In some implementations, the service discovery platform 105 offering for an organization has all organization resources registered to provide uniform domain name service (DNS) resolution for microservices offered by the organization. Service discovery database 110 can include a service registry that includes a database of available service instances. Service discovery database 110 can contain a catalog of currently available instances of each service, their connection details, and corresponding host information (sometimes referred as nodes, e.g., entity in the cloud or on-premises). Services in an infrastructure registers themselves to the service registry and make themselves available for other services to communicate with.

In some implementations, any service that is deployed to a resource across any of data centers 120 (e.g., any cloud region or on premises data center) in an infrastructure, is automatically registered to its service discovery platform through a service discovery agent. In some implementations, services registered to the service discovery platform 105 can use the following naming convention for its resolution productName-microserviceName-environment-service-.companyname. The naming convention can be utilized to automatically apply tags for a resource, for example, a resource can be automatically tagged with its product name, microservice name, environment type (e.g., production, development, test, and the like), service name, and company name.

Some implementations of the current subject matter includes an inventory management system 125 that leverages service discovery platform 105 to tag resources that come online and register to the service. Since some implementations of service discovery platform 105 can manage different workloads such as kubernetes (k8s), virtual machines, bare metal (e.g., single tenant) on-premises devices, and the like, the inventory management system 125 can utilize the services discovery platform 105 to enable a mapping between tags and resources in real time by ensuring the system is in contact with every cloud resource for every cloud provider.

To illustrate further, the inventory management system 125 can include an inventory web service 130 and an inventory database 135. The inventory database 135 can include tags (e.g., labels) for each resource and other metadata and the inventory web service 130 can provide for external access into the inventory database 135. Inventory management system 125 can periodically query the service discovery platform's 105 catalog for each datacenter 120. Inventory web service 130 can process the response data of the catalog to gather all services and its corresponding node information to generate an inventory. The inventory web service 130 can generate a data model for each catalog record and append the data model with business metadata, such as cost center number, department name, or the like. A data model can include a model or data structure that organizes elements of data and standardizes how they relate to one another and to the properties of real-world entities. For instance, a data model may specify that the data element representing a resource be composed of a number of other elements which, in turn, represent business metadata such as a tag or label. The result of the data model can then be stored in the inventory database 135.

In some implementations, the inventory database 135 can be considered a snapshot of the cloud and on-premises resources, and that snapshot can be dynamically updated. For example, the service discovery platform 105 can maintain an up-to-date catalog of resources within services discovery database 110. In some implementations, the catalog can be considered dynamic in that the catalog can quickly change as resource instantiations are scaled up and/or down depending on demand. The inventory web service 130 can periodically query or poll the service discovery database 110 for modifications to the catalog. When the inventory web service 130 receives an update, the inventory web service 130 can modify any appropriate data model stored in the inventory database 135.

The inventory database 135 can be queried. For example, an API can be included at the database to enable a user to provide new tags, modify existing tags, update tagging rules, and identify the resources associated with a tag.

Some implementations can utilize Kubternetes for cloud-based application deployment and management. Kubernetes can include an open-source container-orchestration system for automating computer application deployment, scaling, and management. With respect to Kubernetes workload inventory, a service registration for Kubernetes workloads works differently than other workloads such as virtual machines and bare metal servers. A service discovery agent runs as a Dameon Set in a Kubernetes cluster, which enforces an agent to be run on each node that gets created as part of the Kubernetes cluster. This ensures that every node and its corresponding pods are registered in the service discovery register catalog. Although Kubernetes is described in some examples, other orchestrations, such as Apache Mesos, Docker Swarm, and the like, can be used as well.

The following are example payloads including service discovery platform 105 catalog response payload, inventory web service 130 response payload, and catalog entry examples per resource type. With respect to service discovery platform 105 catalog response payload, a payload response payload for a node can contain information for forming the metadata for the resource inventory.

TABLE 1

Service Discovery Platform Catalog Response Payload:
-workload_type: "Meta" field under the Services block has an attribute "deployment-type" contains the information of the type of workload, (e.g.: "deployment_type": "k8s")
-ID : "ID" field under services block is a unique identifier which is usually the name of a product.(e.g.,: ID": "product-name",
-Service: "Service" field in Service block is usually the name of the service.
Inventory Web Service Response Payload:
{
    "InventoryMetadata":
    {
    "Product": "Citrix Cloud",
    "Microservice": "Delegated Administration",
    "CostCenter": "10012"
      }
    "Node": "aks-citrix-00001.vm",
    "Address": "10.1.10.12",
    "Datacenter": "us-east",
    "TaggedAddresses": {
      "lan": "10.1.10.12",
      "wan": "10.1.10.12"
    },
    "instance_type": "DS2_V2"
}
Catalog Entry Examples (Kubernetes):
{
  "Node": {
    "ID": "40e4a748-2192-161a-0510-9bf59fe950b5",
    "Node": "aks-citrix-00001.vm",
    "Address": "10.1.10.12",
    "Datacenter": "us-east",
    "TaggedAddresses": {
      "lan": "10.1.10.12",
      "wan": "10.1.10.12"
    },
    "Meta": {
      "instance_type": "DS2_V2"
    }
  },
  "Services": {
    "consul": {
      "ID": "consul",
      "Service": "consul",
      "Tags": null,
      "Meta": {
        "deployment_type" : "k8s"
      },
      "Port": 8300
    },
    "login": {
      "ID": "citrix-cloud",
      "Service": "citrix-cloud-login",
      "TaggedAddresses": {
        "lan": {
          "address": "10.1.10.12",
          "port": 8000
        },
        "wan": {
          "address": "198.18.1.2",
          "port": 80
        }
      },
      "Tags": ["v1"],
      "Meta": {
        "redis_version": "4.0"
      },
      "Port": 8000,
      "Namespace": "default"
    },
    "billing": {

TABLE 1-continued

```
      "ID": "citrix-cloud",
      "Service": "citrix-cloud-billing",
      "TaggedAddresses": {
        "lan": {
          "address": "10.1.11.12",
          "port": 8001
        },
        "wan": {
          "address": "198.18.1.12",
          "port": 80
        }
      }
    }
  }
}
}
Catalog Entry Examples (Database):
{
  "Node": {
    "ID": "40e4a748-2192-161a-0510-9bf59fe950b5",
    "Node": "db-citrix-00001.cosmosdb",
    "Address": "10.1.10.12",
    "Datacenter": "us-east",
    "TaggedAddresses": {
      "lan": "10.1.10.12",
      "wan": "10.1.10.12"
    },
    "Meta": {
      "instance_type": "CosmosDB"
    }
  },
  "Services": {
    "consul": {
      "ID": "consul",
      "Service": "consul",
      "Tags": null,
      "Meta": {
         "deployment_type" : "database"
      },
      "Port": 8300
    },
  }
}
```

In some implementations, the services discovery platform 105 can utilize a hypertext transfers protocol (HTTP) layer health check for services. The HTTP layer health check can form part of the services mesh 115. The application-level health check can monitor the health of the services. If the application-level health check fails, the catalog can update the information that the service is down but the node is still up.

In some implementations, the services discovery platform 105 can utilize a gossip layer health check for nodes. An example services discovery platform 105 can utilize gossip protocol Serf, which operates on the transport layer to make sure the node is healthy and responding. If a node fails to respond to the gossip messages for over a period of time, then the service discovery platform 105 can update the catalog to indicate that both the node and its service(s) are down.

In some implementations, cloud resources can be tagged with their associated microservices, services, and/or products. A microservice can be considered as a set of code deployed to the cloud with a specific scoping to service a specific purpose. A service can be considered as a set of microservices that manifests as a feature or product. A set of one or more services can form a product. Thus a product can be considered to be formed of at least one service, and the at least one service can be considered to be formed of at least one microservice. Example products can include virtual applications, virtual desktops, and the like.

In some implementations, multiple products may utilize at least some of the same services (e.g., a service may belong to multiple products). A service or feature can also be provided separately (e.g., as an "add-on" to a product). In some implementations, multiple services and products may utilize at least some of the same microservices (e.g., a microservices may belong to multiple services and multiple products).

In some implementations, database 135 can be queried. For example, the database 135 can be queried for the inventory listing the various deployed products and/or services, which can take the form of one or more data models. The data model can be utilized to group the resources by product name to create a list or sub-list of resources for each product, which can be considered a bill of materials. The grouping can be by other components in the hierarchy as well. For example, the grouping can be by product, service, component, and/or microservice name. Each cloud provider can be queried to obtain cost information for each resource. Using the cost information, a bill of materials for the component can be returned with the cost information.

Figure 2:
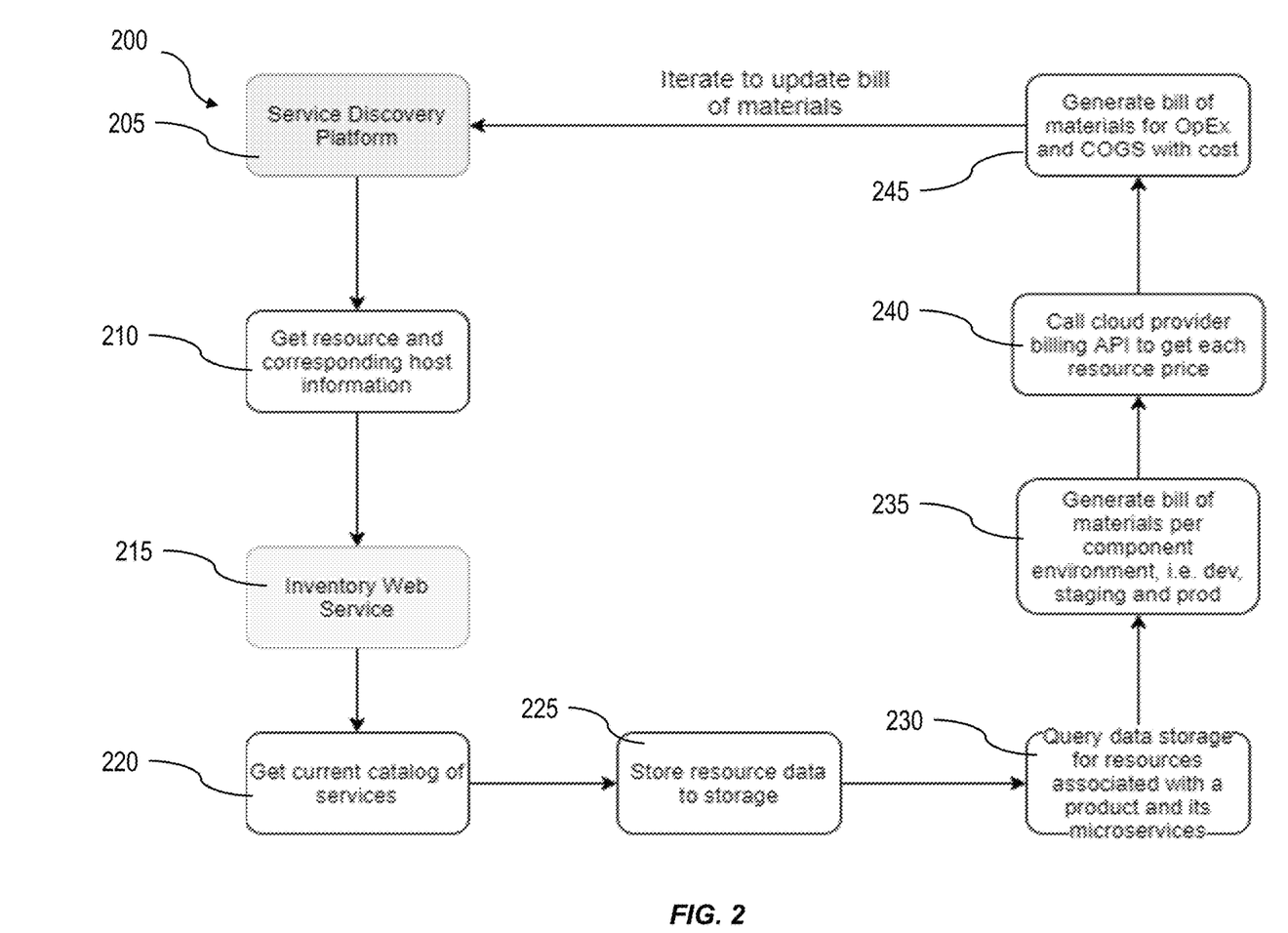
FIG. 2 illustrates an example process flow diagram illustrating an example process according to some example implementations.

FIG. 2 illustrates an example process flow diagram illustrating an example process 200 according to some example implementations of the current subject matter. At 205, microservices within an infrastructure register with a services discovery platform. Service discovery platform can include a service registry that includes a database including a catalog of currently available instances of each service, their connection details, and corresponding host information. Services in an infrastructure registers themselves to the service registry and make themselves available for other services to communicate with.

At 210, the service discovery platform maintains a current catalog including information regarding resource and corresponding host information in the registry. In some implementations, the current catalog information can be an up-to-date (e.g., real time) snapshot of microservices and associated resources that are present within the infrastructure (which may span multiple data centers and cloud providers).

At 215, the inventory web service queries or polls the service discovery platform for a current catalog. The query or poll can be periodic (e.g., regular, from time to time). At 220, the inventory web service receives the catalog information from the services discovery platform.

At 225, the inventory web service stores the resource data from the catalog to the inventory database. The storage can include determining or preparing a data model of the resources, including applying one or more tags, for example, related to product, component, service, and/or microservice name. Other tags or labels may be used as well. In some implementations, the tags are created according to predefined tag rules established by an organization. Such an approach to tag management can centralize the tagging of resources, which does not require the tags to be applied on a per cloud provider basis.

At 230, the inventory database can be queried for resources associated with a product and its microservices. For example, the inventory web service can include an API that allows for querying of the inventory database.

At 235, the queried resource information can be grouped by product, service, microservice, component, or the like. For example, all resources associated with a product can be grouped together into a list of resources. The list of resources can be considered as a bill of materials for the product, service, microservice, component, or the like.

At 240, an API call can be made to each cloud provider billing API for which there is a resource on the list of resources. The API call can obtain or retrieve a cost of each resource from the cloud provider. The cost information can reflect the cost or price charged by the cloud provider for providing a given resource, for example, for a given unit of time. In the case of on-premises resources, a separate database or data source can be queried. On premises resource costs can be computed as an initial investment plus an ongoing monthly, daily, or hourly cast calculated based on the cost of the server hardware, power consumption, and space utilized (e.g., rent costs).

At 245, the cost information can be associated with and/or added to the list of resources to create a list of resources per product (or service, microservice, component, and the like) that also characterizes the costs of those resources. The list of resources with associated costs can be useful, for example, for improving cloud resource management, enabling policies to limit the number of resources thereby controlling costs, and the like. In some implementations, the list of resources with costs can enable determining cloud resource utilization metrics for a given product.

The process can return to 205, and the entire process 200 can repeat, for example, on a periodic basis or upon receiving an instruction to generate a bill of materials.

Figure 3:
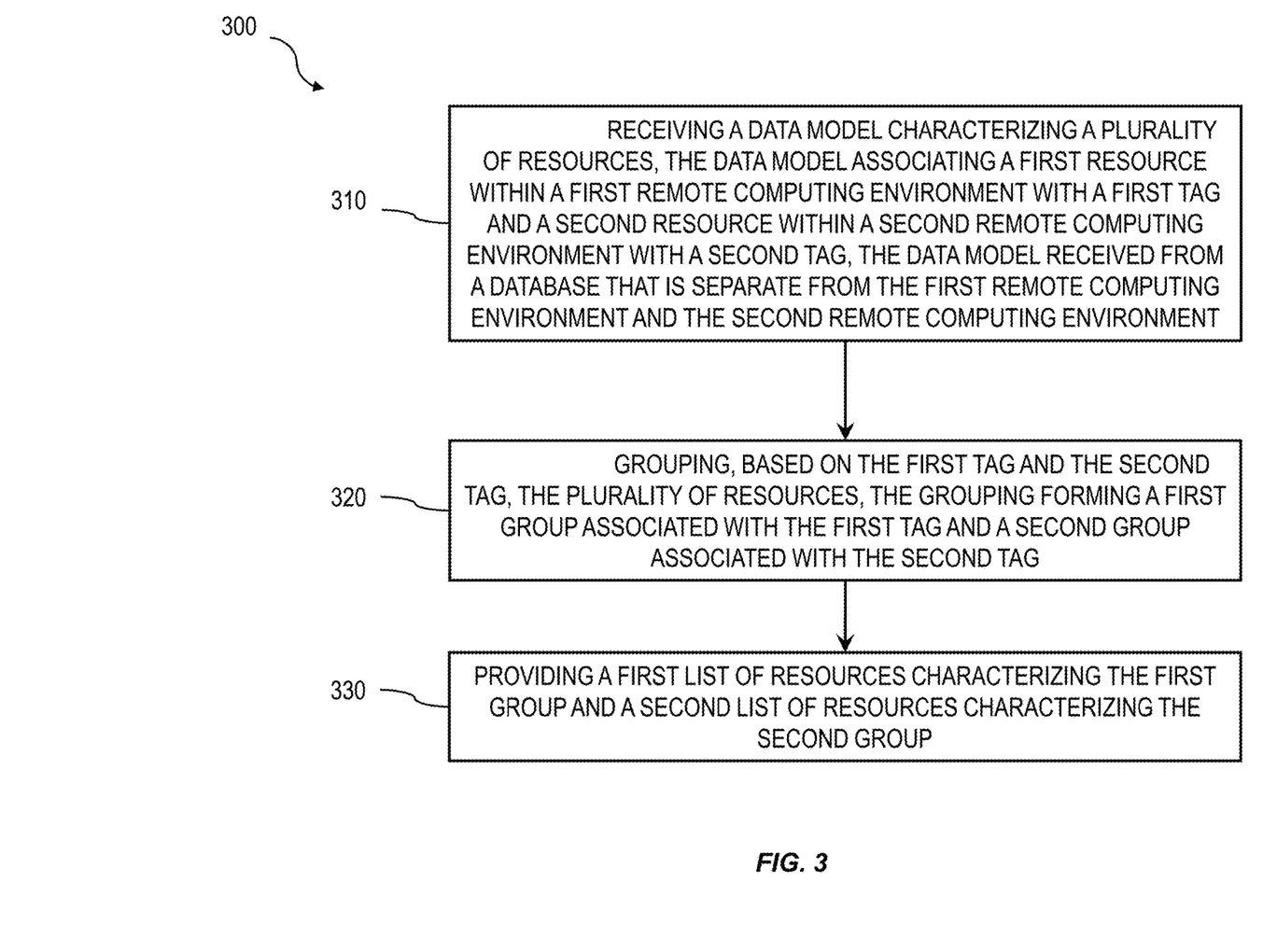
FIG. 3 is a process flow diagram illustrating an example process of generating a bill of materials for cloud resources across multiple data centers (e.g., cloud providers) according to some example implementations.

FIG. 3 is a process flow diagram illustrating an example process 300 of generating a bill of materials for cloud resources across multiple data centers (e.g., cloud providers) that can enable centralized management and analysis of those resources. The approach to centralized management and analysis of resources across multiple disparate data centers can provide for more efficient management of resources.

At 310, a data model characterizing resources is received. The data model associates a first resource within a first remote computing environment (e.g., cloud provider, host, and the like) with a first label (e.g., a tag) and a second resource within a second remote computing environment (e.g., cloud provider, host, and the like) with a second label. The data model can be received from a database that is separate from the first remote computing environment and the second remote computing environment.

As noted above, a data model is a model or data structure that organizes elements of data and standardizes how they relate to one another and to the properties of real-world entities. For instance, a data model may specify that the data element representing a resource be composed of a number of other elements which, in turn, represent the business metadata such as a tag or label.

The remote computing environments can include, for example, cloud systems such as MICROSOFT AZURE®, AMAZON WEB SERVICES® (AWS), and the like. For example, the first remote computing environment can include a first cloud resource provider and the second remote computing environment can include a second cloud resource provider different than the first cloud resource provider. In some implementations, the first remote computing environment includes an on premise computing environment, for example, a bare metal (e.g., single tenant) system.

The data can be received from a database separate from a plurality of remote computing environments. For example, the database can be remote, independent of, and/or operated by an entity different than the operators of the database. The resources can include a virtual machine, a storage account, a web application, a database, a virtual network, and/or the like.

The database can form part of a services discovery platform, for example, as described more fully above with respect to FIGS. 1 and 2. The database can form part of a services discovery platform including a service registry containing identities of available service instances and associated connection information for services within a computing infrastructure. New service instances, during or after instantiation, register with the services registry.

In some implementations, the data characterizing the list of resources includes a first identity associated with a first software application and a first identity of a host of the first software application. For example, the list of resources can include the identity of a first application (e.g., application #1) and an identity of the host of the first software application (e.g., AWS®). The list of resources can include a second identity associated with a second software application (e.g., application #2) and a second identity associated with a host of the second software application (e.g., AZURE®).

In some implementations, the services discovery platform is separate from the first host and separate from the second host. For example, if the first host includes a first entity operating and/or providing the first remote computing environment, and the second host includes a second entity operating and/or providing the second remote computing environment, then the services discovery platform is separate (e.g., independent of, remote from, and the like) the first and second entities.

At 320, the plurality of resources are grouped using the first tag and the second tag. The grouping can form a first group associated with the first tag and a second group associated with the second tag. For example, all resources associated with or tagged as associated with a first product can be grouped together and all resources associated with or tagged as associated with a second product can be grouped together. The grouping can be by component of the product (e.g., service, microservice, and the like). For example, the grouping can be according to a plurality of components of a product, the first tag including a first identity of a first component of the product, and the second tag includes a second identity of a second component of the product. In some implementations, the grouping can be by another tag, which can be customized. For example, the resources can be grouped by costs center, department, and the like.

At 330, a first list of resources characterizing the first group and a second list of resources characterizing the second group can be provided. The providing can include providing the costs associated with hosting resources. In some implementations, the providing can include displaying, transmitting, storing, and/or further processing the list of resources.

In some implementations, a plurality of remote computing environments can be queried for costs associated with hosting resources. For example, the querying can include querying the first remote computing environment for first costs associated with hosting the first resource within the first remote computing environment, and querying the second remote computing environment for second costs associated with hosting the second resource within the second remote computing environment. In some implementations, the first costs can be associated with the first resource and the second costs can be associated with the second resource such that the first list of resources includes (e.g., characterizes) the first costs and the second list of resources characterizes the second costs.

In some implementations, the first list of resources and the second list of resources can be updated. The updating can be based on receiving data characterizing changes to the data model. For example, in some implementations, the data model is updated based on receiving changes to the metadata and/or changes to at least one of the first resource or the second resource. For example, if the first resource becomes inactive (e.g., unavailable), then the data model can be updated to reflect a current state or inventory of all resources under management. Similarly, the data model can be updated based on a new resource being instantiated. The updating can include, for example, receiving the changes to the data model and regrouping the resources based at least on the changes to the data model. The first list of resources and the second list of resources can be updated based on the regrouped resources.

In some implementations, a services discovery agent is utilized to register new instantiations of services to the database thereby maintaining the database, which forms part of a service registry containing identities of available service instances and associated connection information for services within a computing infrastructure.

In some implementations, the bill of materials and associated costs can enable rules-based actions. For example, if costs associated with a product are over a predefined amount or budget, an alert can be sent for human intervention. In addition, the bill of materials and associated costs can be used to generate a budget per product or microservice by evaluating current and past cost trends.

Some implementations of the current subject matter can provide for many technical advantages. For example, some implementations of the current subject matter can provide an inventory of resources that can be used to manage security by mapping connectivity between resources.

Figure 4:
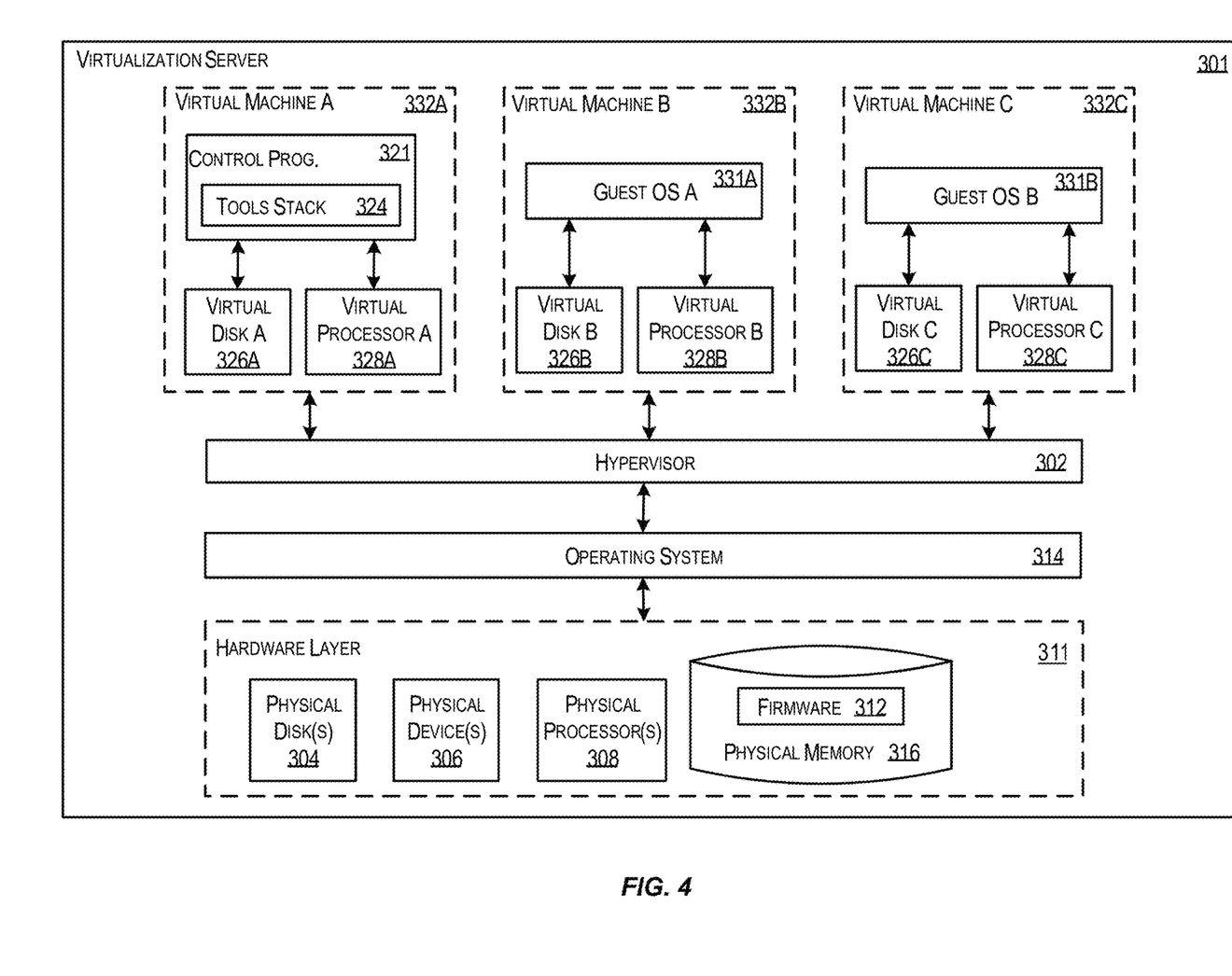
FIG. 4 shows a high-level architecture of an illustrative virtualization system contained within a datacenter including one or more resources as referenced and described with respect to FIG. 1 according to some example implementations.

FIG. 4 shows a high-level architecture of an illustrative virtualization system, for example, contained within one of datacenters 120 including one or more resources as referenced and described with respect to FIG. 1. As shown, the virtualization system may be a single-server or multi-server system, or a cloud system, including at least one virtualization server 301 configured to provide virtual desktops and/or virtual applications to one or more client access devices 102a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 may be deployed as and/or implemented by one or more embodiments of server 106 illustrated in FIG. 5A or by other known computing devices. Included in virtualization server 301 is hardware layer 311 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 321 that includes tools stack 324. Control program 321 may be referred to as a control virtual machine, Domain 0, Dom0, or other virtual machine used for system administration and/or control. In some embodiments, one or more virtual machines 332B-C may execute, using virtual processor 328B-C, guest operating system 331A-B (generally 331).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 311 may include any type of memory. Physical memory 316 may store data, and in some embodiments may store one or more programs, or set of executable instructions. In the illustrated embodiment, firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 311. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 331 or control programs 321 executing on virtual machines 332 in any manner that simulates operating systems 331 or control programs 321 having direct access to system resources. System resources can include, but are not limited to, physical devices 306, physical disks 304, physical processors 308, physical memory 316, and any other component included in hardware layer 311 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 331 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 331 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 331 within virtual machine 332. In still other embodiments, virtual machine 332 may execute guest operating system 331.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 311). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

The virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While the illustrated embodiment is one where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

Figure 5A:
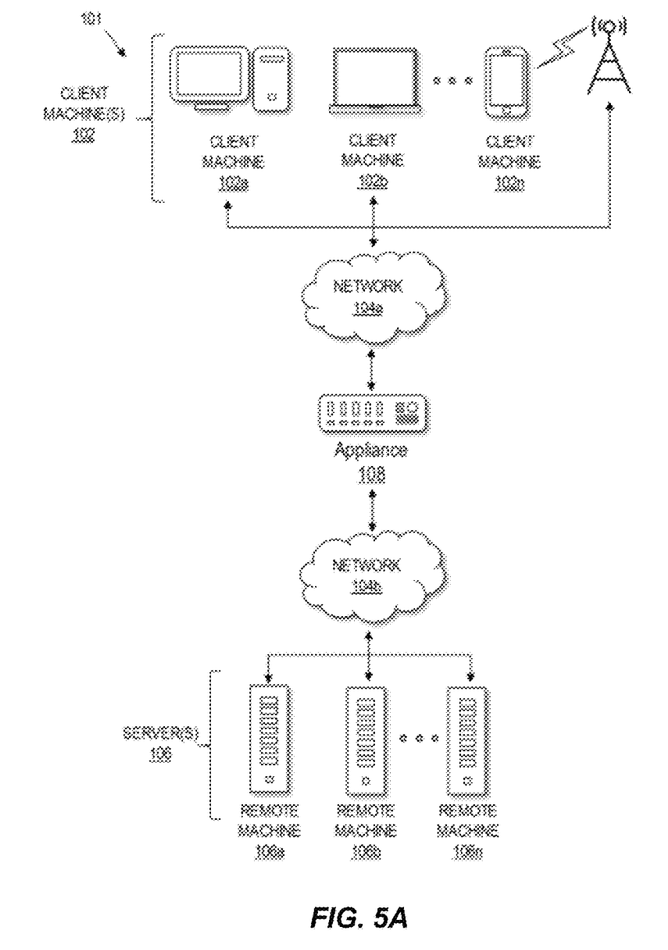
FIG. 5A depicts a network diagram illustrating an example of a network environment according to some example implementations.

FIG. 5A depicts a network diagram illustrating an example of a network environment 101. The network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can communicate with the remote machines 106a-106n via an appliance 108. The illustrated appliance 108 is positioned between the networks 104a and 104b, and can also be referred to as a network interface or gateway. The appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. Multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. The client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

The server 106 can execute a remote presentation services program or other program that uses a thin-client or a remote-display protocol to capture display output generated by an application executing on a server 106 and transmit the application display output to a client 102.

The server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106. The virtual machine can be deployed within a cloud provider.

The network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 5B:
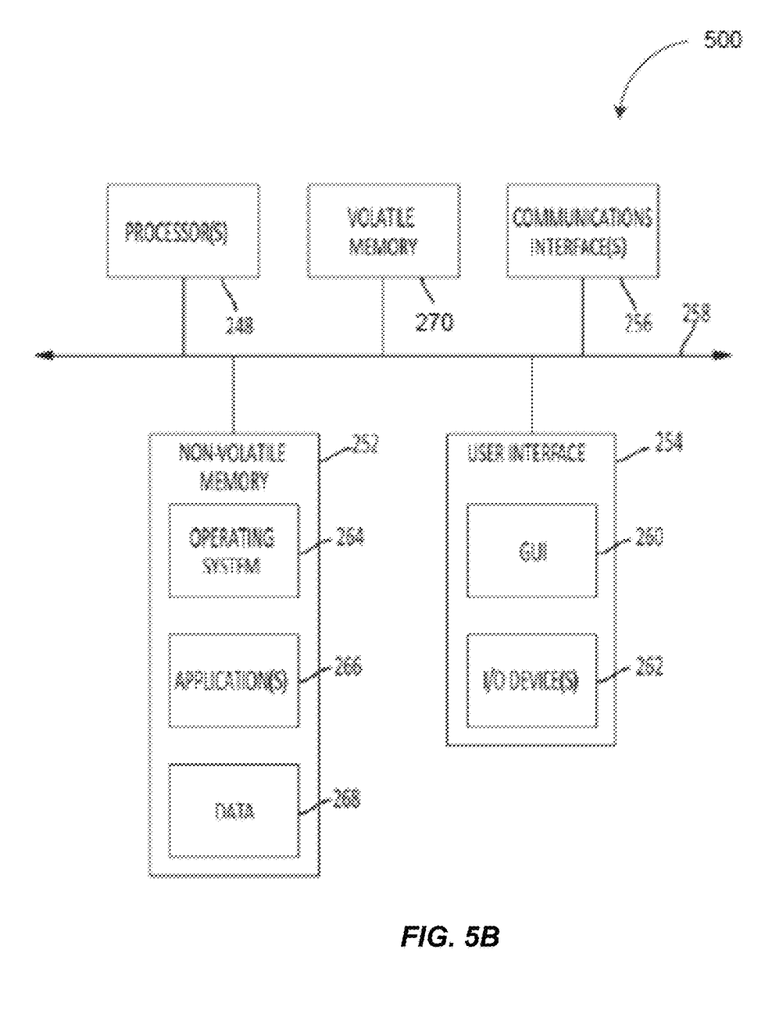
FIG. 5B depicts a block diagram illustrating an example of a computing device according to some example implementations.

FIG. 5B depicts a block diagram illustrating an example of a computing device 500, in accordance with some example embodiments. Referring to FIGS. 5A-B, the computing device 500 can be useful for practicing an embodiment of the clients 102, the servers 106, and/or the appliances 108.

The computing device 500 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 500 can communicate via communication the bus 258. The computing device 500 is shown merely as an example, as the clients 102, the servers 106, and the appliances 108 can be implemented by any computing or processing environment and with any type of machine or set of machines that can have suitable hardware and/or software capable of operating as described herein.

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method comprising:
   receiving a data model characterizing a plurality of resources, the data model associating a first resource within a first remote computing environment with a first tag and a second resource within a second remote computing environment with a second tag, the data model received from a database that is separate from the first remote computing environment and the second remote computing environment;
   grouping, based on the first tag and the second tag, the plurality of resources, the grouping forming a first group associated with the first tag and a second group associated with the second tag;
   querying a plurality of remote computing environments for costs associated with hosting resources, the querying including:
      querying, using at least an application programming interface of the first remote computing environment, the first remote computing environment for first costs associated with hosting the first resource within the first remote computing environment, and
      querying the second remote computing environment for second costs associated with hosting the second resource within the second remote computing environment; and
   providing a first list of resources characterizing the first group and a second list of resources characterizing the second group, wherein the providing further includes providing the first costs and the second costs.

2. The method of claim 1, further comprising:
   associating the first costs with the first resource; and
   associating the second costs with the second resource;
   wherein the first list of resources further characterizes the first costs, and wherein the second list of resources further characterizes the second costs.

3. The method of claim 1, wherein the grouping is according to product identity, wherein the first tag includes a first product identity and the second tag includes a second product identity, wherein a product includes a plurality of associated services.

4. The method of claim 1, wherein the grouping is according to a plurality of components of a product, wherein the first tag includes a first identity of a first component of the product, the second tag includes a second identity, wherein the second identity is of a second component of the product, and wherein the first component of the product includes a first service and the second component of the product includes a second service.

5. The method of claim 1, further comprising:
receiving data characterizing changes to the data model;
regrouping, based on the received data, the plurality of resources, the regrouping forming a modified first group associated with the first tag and a modified second group associated with the second tag; and
updating the first list of resources based at least on the modified first group and updating the second list of resources based at least on the modified second group.

6. The method of claim 1, wherein the first remote computing environment includes a first cloud resource provider and the second remote computing environment includes a second cloud resource provider different than the first cloud resource provider.

7. The method of claim 1, wherein the first remote computing environment includes an on premise computing environment.

8. The method of claim 1, wherein the data model is received from a database that forms part of a services discovery platform including a service registry, wherein the service registry contains identities of available service instances and associated connection information for services within a plurality of remote computing environments, and wherein new service instances, during or after instantiation, register with the services registry.

9. The method of claim 1, wherein the first resource includes a virtual machine, a storage account, a web application, a database, and/or a virtual network.

10. The method of claim 1, wherein the querying the second remote computing environment for second costs associated with hosting the second resource within the second remote computing environment is performed using at least an application programming interface of the second remote computing environment; and
wherein the first remote computing environment includes a first cloud resource provider and the second remote computing environment includes a second cloud resource provider different than the first cloud resource provider.

11. A system comprising:
at least one data processor; and
memory storing instructions which, when executed by the at least one data processor, causes the at least one data processor to perform operations comprising:
receiving a data model characterizing a plurality of resources, the data model associating a first resource within a first remote computing environment with a first tag and a second resource within a second remote computing environment with a second tag, the data model received from a database that is separate from the first remote computing environment and the second remote computing environment;
grouping, based on the first tag and the second tag, the plurality of resources, the grouping forming a first group associated with the first tag and a second group associated with the second tag;
querying a plurality of remote computing environments for costs associated with hosting resources, the querying including:
querying, using at least an application programming interface of the first remote computing environment, the first remote computing environment for first costs associated with hosting the first resource within the first remote computing environment, and
querying the second remote computing environment for second costs associated with hosting the second resource within the second remote computing environment; and
providing a first list of resources characterizing the first group and a second list of resources characterizing the second group, wherein the providing further includes providing the first costs and the second costs.

12. The system of claim 11, the operations further comprising:
associating the first costs with the first resource; and
associating the second costs with the second resource;
wherein the first list of resources further characterizes the first costs, and wherein the second list of resources further characterizes the second costs.

13. The system of claim 11, wherein the grouping is according to product identity, wherein the first tag includes a first product identity and the second tag includes a second product identity, wherein a product includes a plurality of associated services.

14. The system of claim 11, wherein the grouping is according to a plurality of components of a product, wherein the first tag includes a first identity of a first component of the product, the second tag includes a second identity, wherein the second identity is of a second component of the product, and wherein the first component of the product includes a first service and the second component of the product includes a second service.

15. The system of claim 11, the operations further comprising:
receiving data characterizing changes to the data model;
regrouping, based on the received data, the plurality of resources, the regrouping forming a modified first group associated with the first tag and a modified second group associated with the second tag; and
updating the first list of resources based at least on the modified first group and updating the second list of resources based at least on the modified second group.

16. The system of claim 11, wherein the first remote computing environment includes a first cloud resource provider and the second remote computing environment includes a second cloud resource provider different than the first cloud resource provider.

17. A non-transitory computer readable medium storing instructions which, when executed by at least one data processor forming part of at least one computing system, causes the at least one data processor to perform operations comprising:
receiving a data model characterizing a plurality of resources, the data model associating a first resource within a first remote computing environment with a first tag and a second resource within a second remote computing environment with a second tag, the data model received from a database that is separate from the first remote computing environment and the second remote computing environment;
grouping, based on the first tag and the second tag, the plurality of resources, the grouping forming a first group associated with the first tag and a second group associated with the second tag;
querying a plurality of remote computing environments for costs associated with hosting resources, the querying including:
querying, using at least an application programming interface of the first remote computing environment, the first remote computing environment for first costs associated with hosting the first resource within the first remote computing environment, and querying the second remote computing environment for second costs associated with hosting the second resource within the second remote computing environment; and providing a first list of resources characterizing the first group and a second list of resources characterizing the second group, wherein the providing further includes providing the first costs and the second costs.

\* \* \* \* \*